United States Patent
Tomioka

(10) Patent No.: US 12,280,776 B2
(45) Date of Patent: Apr. 22, 2025

(54) PATH GENERATION APPARATUS AND PATH GENERATION METHOD

(71) Applicant: Honda Motor Co., Ltd., Tokyo (JP)

(72) Inventor: Kazuki Tomioka, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 121 days.

(21) Appl. No.: 18/098,687

(22) Filed: Jan. 18, 2023

(65) Prior Publication Data
US 2023/0234581 A1 Jul. 27, 2023

(30) Foreign Application Priority Data
Jan. 24, 2022 (JP) .................... 2022-008738

(51) Int. Cl.
*B60W 30/12* (2020.01)
*B60W 40/072* (2012.01)
*B60W 40/114* (2012.01)

(52) U.S. Cl.
CPC .......... *B60W 30/12* (2013.01); *B60W 40/072* (2013.01); *B60W 40/114* (2013.01);
(Continued)

(58) Field of Classification Search
CPC .................. B60W 30/12; B60W 30/16; B60W 30/18163; B60W 40/072; B60W 40/105; B60W 2420/403; B60W 2420/408; B60W 2552/30; B60W 2554/802; B60W 2520/10; G08G 1/096805; G08G 1/052; G08G 1/08; G08G 1/096725

See application file for complete search history.

(56) References Cited

U.S. PATENT DOCUMENTS

| | | | | |
|---|---|---|---|---|
| 5,521,579 A | * | 5/1996 | Bernhard | ........ B60W 30/18163 340/438 |
| 5,913,375 A | * | 6/1999 | Nishikawa | ............... B62D 6/00 701/28 |

(Continued)

FOREIGN PATENT DOCUMENTS

| | | |
|---|---|---|
| JP | 2018118589 A | 8/2018 |
| JP | 2018181209 A | 11/2018 |

(Continued)

OTHER PUBLICATIONS

Japanese office action; Application 2022-008738; Dec. 5, 2023.

*Primary Examiner* — Phutthiwat Wongwian
*Assistant Examiner* — Brian R Kirby
(74) *Attorney, Agent, or Firm* — Duft & Bornsen, PC

(57) ABSTRACT

Path generation apparatus configured to generate target travel path of vehicle, includes: external sensor mounted on vehicle and configured to detect external situation centered on advancing direction of vehicle; and electronic control unit including processor and memory coupled to processor. Electronic control unit is configured to perform: recognizing travel lane where vehicle travels based on external situation detected by external sensor; deriving first function representing travel path along center of travel lane; calculating curvature radius of travel lane; determining offset amount to be offset inward in turning direction from center of travel lane based on curvature radius; and deriving second function representing target travel path of vehicle that has been offset based on first function and offset amount.

10 Claims, 5 Drawing Sheets

(52) U.S. Cl.
CPC . *B60W 2420/403* (2013.01); *B60W 2420/408* (2024.01); *B60W 2520/14* (2013.01); *B60W 2552/30* (2020.02); *B60W 2552/53* (2020.02)

(56) References Cited

U.S. PATENT DOCUMENTS

| | | | | |
|---|---|---|---|---|
| 6,032,097 | A * | 2/2000 | Iihoshi | G05D 1/0293 |
| | | | | 340/436 |
| 7,509,211 | B2 * | 3/2009 | Niwa | B62D 15/025 |
| | | | | 340/901 |
| 2004/0193374 | A1 * | 9/2004 | Hac | G08G 1/166 |
| | | | | 701/301 |
| 2007/0069873 | A1 * | 3/2007 | Kudo | B62D 15/029 |
| | | | | 340/435 |
| 2010/0082195 | A1 * | 4/2010 | Lee | B62D 15/0255 |
| | | | | 701/25 |
| 2011/0144859 | A1 * | 6/2011 | Suk | G06V 20/588 |
| | | | | 382/104 |
| 2016/0107682 | A1 * | 4/2016 | Tan | B60W 30/18163 |
| | | | | 701/41 |
| 2016/0313133 | A1 * | 10/2016 | Zeng | B60W 60/0011 |
| 2018/0208183 | A1 * | 7/2018 | Glander | B60W 40/072 |
| 2018/0345969 | A1 * | 12/2018 | Yasui | B60W 50/04 |
| 2018/0345991 | A1 * | 12/2018 | Mimura | B60W 50/14 |
| 2018/0354513 | A1 * | 12/2018 | Moshchuk | B62D 6/002 |
| 2019/0092328 | A1 * | 3/2019 | Ide | B60W 60/00276 |
| 2019/0113925 | A1 * | 4/2019 | Sim | G06V 20/588 |
| 2019/0276049 | A1 * | 9/2019 | Kinoshita | B60W 30/08 |
| 2019/0361450 | A1 * | 11/2019 | Sheckells | B60W 10/20 |
| 2020/0094844 | A1 * | 3/2020 | Aoki | B60W 40/072 |
| 2021/0387645 | A1 * | 12/2021 | Kim | B60W 30/18154 |
| 2022/0126823 | A1 * | 4/2022 | Lu | B60W 60/001 |

FOREIGN PATENT DOCUMENTS

| | | | | |
|---|---|---|---|---|
| JP | 2019059441 | A | | 4/2019 |
| JP | 2019089549 | A | | 6/2019 |
| JP | 2019156066 | A | | 9/2019 |
| KR | 20150107361 | A | * | 9/2015 ............ B60W 30/12 |

* cited by examiner

PATH GENERATION APPARATUS AND PATH GENERATION METHOD

CROSS-REFERENCE TO RELATED APPLICATION

This application is based upon and claims the benefit of priority from Japanese Patent Application No. 2022-008738 filed on Jan. 24, 2022, the content of which is incorporated herein by reference.

BACKGROUND OF THE INVENTION

Field of the Invention

This invention relates to a path generation apparatus and a path generation method configured to generate a target travel path of a vehicle having an automatic driving function or a driving-assistance function.

Description of the Related Art

A device that generates a target travel path of a vehicle for driving automatically is conventionally known (for example, see JP2018-118589A). In the device described in JP2018-118589A, the positions of division lines on both left and right sides of a travel lane are recognized by use of a camera or a radar sensor, the center point between two points facing each other on the left and right division lines is obtained, and a target travel path is generated by connecting a plurality of center points.

As vehicles each having an automatic driving function and a driving-assistance function become widely used, the safety and convenience of the entire traffic society are improved, and a sustainable transportation system is achievable. In addition, as the efficiency and smoothness of transportation are improved, $CO_2$ emission amounts are reduced, and loads on the environment can be reduced.

When driving on a curved road, by the way, a skilled driver may drive the vehicle to be offset inward in a turning direction with respect to the center of the travel lane. However, in the device described in JP2018-118589A, the target travel path for the vehicle to travel in the center of the travel lane is simply generated, and it is difficult to generate a target travel path that is natural, like when the skilled driver drives on the curved road.

SUMMARY OF THE INVENTION

An aspect of the present invention is a path generation apparatus configured to generate a target travel path of a vehicle, including: an external sensor mounted on the vehicle and configured to detect an external situation centered on an advancing direction of the vehicle; and an electronic control unit including a processor and a memory coupled to the processor. The electronic control unit is configured to perform: recognizing a travel lane where the vehicle travels based on the external situation detected by the external sensor; deriving a first function representing a travel path along a center of the travel lane; calculating a curvature radius of the travel lane; determining an offset amount to be offset inward in a turning direction from the center of the travel lane based on the curvature radius; and deriving a second function representing the target travel path of the vehicle that has been offset based on the first function and the offset amount.

Another aspect of the present invention is a path generation method configured to generate a target travel path of a vehicle, including: recognizing a travel lane where the vehicle travels based on an external situation centered on an advancing direction of the vehicle detected by an external sensor mounted on the vehicle; deriving a first function representing a travel path along a center of the travel lane; calculating a curvature radius of the travel lane; determining an offset amount to be offset inward in a turning direction from the center of the travel lane based on the curvature radius; and deriving a second function representing the target travel path of the vehicle that has been offset based on the first function and the offset amount.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 6. A path generation apparatus according to an embodiment of the present invention is applied to a vehicle having a driving-assistance function of controlling a travel actuator to conduct driving assistance for a driver of the vehicle or to automatically drive the vehicle, and generates a target travel path (target travel path) of the vehicle. The "driving assistance" in the present embodiment includes driving assistance for assisting driver's driving operations and automatic driving for automatically driving a vehicle without depending on the driver's driving operations, and corresponds to levels 1 to 4 of driving automation defined by SAE, and the "automatic driving" corresponds to the level 5 driving automation.

Figure 1:
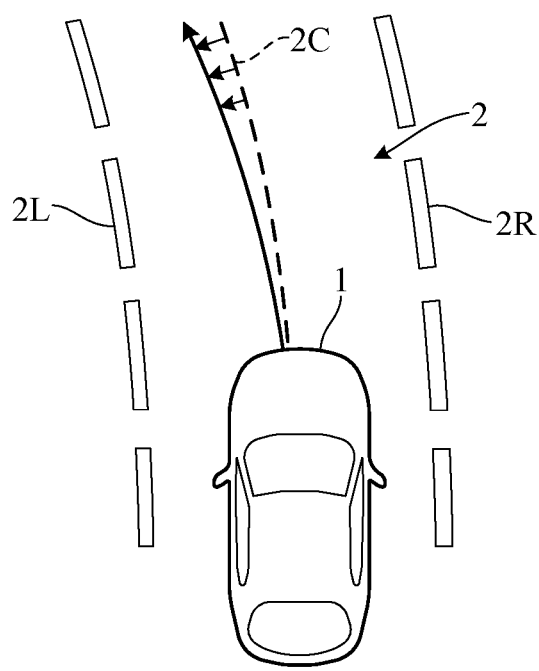
FIG. 1 is a diagram for describing a travel path of a vehicle when a skilled driver drives on a curved road.

FIG. 1 is a diagram for describing a travel path of a vehicle 1 when a skilled driver drives on a curved road. As indicated by a solid arrow in FIG. 1, when driving on the curved road, the skilled driver drives the vehicle to be offset inward in the turning direction with respect to a center 2C of a travel lane 2, which is defined by left and right division lines 2L and 2R, in some cases. This is for traveling the shortest distance or for obtaining a sense of security in consideration of deviating outward in the turning direction due to centrifugal force. For this reason, when the vehicle 1 travels on the curved road by use of driving assistance or automatic driving, if the vehicle 1 is controlled to simply travel in the center 2C of the travel lane 2, the driver or a passenger may have a dissatisfactory or uneasy feeling.

During driving assistance or automatic driving, a traveling state, such as a traveling location, a travel speed, and an advancing direction of the vehicle 1, and an external situation on a forward side of the vehicle 1 are detected at a predetermined cycle, a target travel path of the vehicle 1 is generated in accordance with detection results, and the vehicle 1 is controlled to travel along the target travel path that has been generated. In the present embodiment, the path generation apparatus is configured as follows so as to be capable of generating a target travel path that is natural, like when a skilled driver drives on a curved road, by offsetting the target travel path of the vehicle 1 inward in the turning direction in accordance with a curve with respect to the center 2C of the travel lane 2.

Figure 2:
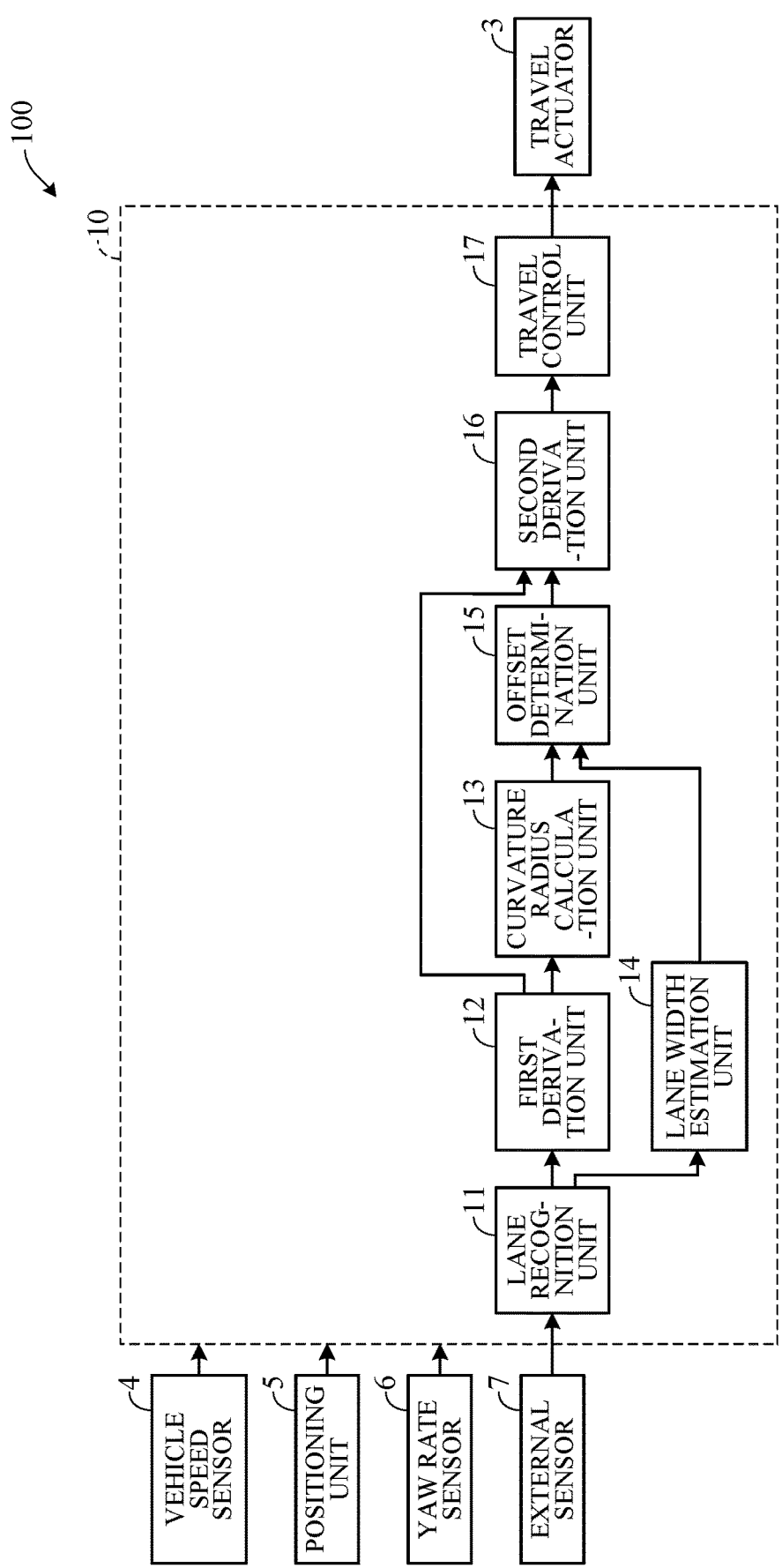
FIG. 2 is a block diagram schematically illustrating an example of a configuration of main components and a processing flow of a path generation apparatus according to an embodiment of the present invention.

FIG. 2 is a block diagram schematically illustrating an example of a configuration of main components and a processing flow of a path generation apparatus (hereinafter, an apparatus) 100 according to an embodiment of the present invention. As illustrated in FIG. 2, the apparatus 100 mainly includes an electronic control unit (ECU) 10. The ECU 10 includes a computer including an arithmetic unit (processor) such as a CPU, a storage unit (memory) such as a RAM and a ROM, an I/O interface, and other peripheral circuits. The ECU 10 is configured, for example, as a part of a plurality of ECU groups that are mounted on a vehicle 1 and that control the operation of the vehicle 1. The processing of FIG. 2 is started, for example, when the vehicle 1 starts operating and the ECU 10 is activated, and is repeated at a predetermined cycle.

A travel actuator 3, a vehicle speed sensor 4, and a positioning unit 5, a yaw rate sensor 6, and an external sensor 7, which are mounted on the vehicle 1, are connected with the ECU 10. The travel actuator 3 includes a steering mechanism such as a steering gear that steers the vehicle 1. The vehicle speed sensor 4 includes, for example, a wheel speed sensor that detects a rotation speed of a wheel, and detects a travel speed (vehicle speed) V of the vehicle 1. The positioning unit 5 measures an absolute location (latitude, longitude, and altitude) of the vehicle 1, based on a positioning signal from a positioning satellite. The yaw rate sensor 6 detects a rotation angular velocity (yaw rate) around a vertical axis of the center of gravity of the vehicle 1. By performing time-integration on a detection value of the yaw rate sensor 6, the absolute azimuth (azimuth) of the vehicle 1 can be calculated.

The external sensor 7 detects an external situation on a forward side of the vehicle with an advancing direction of the vehicle 1 as the center. The external sensor 7 includes, for example, an imaging element such as a CCD or a CMOS, and includes a camera that images a forward side of the vehicle. The external sensor 7 may include a millimeter wave radar that irradiates millimeter waves (radio waves) and measures a distance and a direction to an object by use of a period of time until the irradiated wave hits the object and then returns. The external sensor 7 may include a light detection and ranging (LiDAR) that irradiates laser light and measures a distance and a direction to an object by use of a period of time until the irradiated light hits the object and then returns.

The ECU 10 includes a lane recognition unit 11, a first derivation unit 12, a curvature radius calculation unit 13, a lane width estimation unit 14, an offset determination unit 15, a second derivation unit 16, and a travel control unit 17, as functional configurations of the arithmetic unit. Specifically, the arithmetic unit of the ECU 10 functions as the lane recognition unit 11, the first derivation unit 12, the curvature radius calculation unit 13, the lane width estimation unit 14, the offset determination unit 15, the second derivation unit 16, and the travel control unit 17.

The lane recognition unit 11 recognizes a location of a division line, a curbstone, a guardrail, or the like on a road on a forward side of the vehicle with the advancing direction of the vehicle 1 as the center, based on a signal from the external sensor 7, and thus recognizes the travel lane 2 in which the vehicle 1 is traveling.

Figure 3:
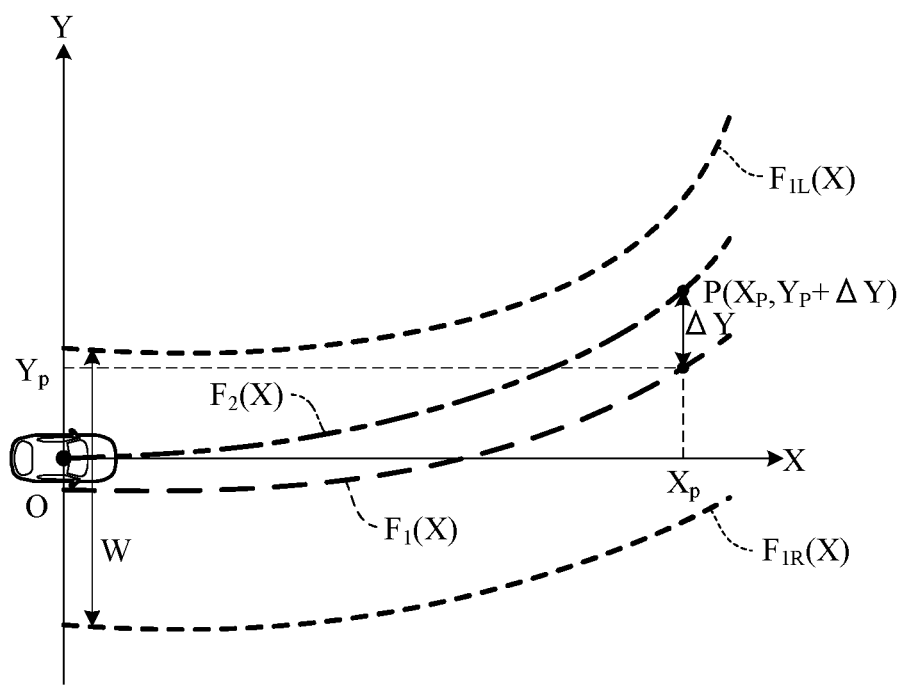
FIG. 3 is a diagram for describing a first function and a second function, which are respectively derived by a first derivation unit and a second derivation unit shown in FIG. 2.

FIG. 3 is a diagram for describing a first function $F_1(X)$ and a second function $F_2(X)$, which are respectively derived by the first derivation unit 12 and the second derivation unit 16. The first derivation unit 12 derives the first function $F_1(X)$ representing a travel path that passes through the center 2C of the travel lane 2 that has been recognized by the lane recognition unit 11.

More specifically, the first derivation unit 12 identifies the advancing direction of the vehicle 1 with respect to the travel lane 2, based on a recognition result by the lane recognition unit 11, and derives the first function $F_1(X)$ with the current location of the vehicle 1 as an origin O and the identified advancing direction as x-axis, as illustrated in FIG. 3. For example, the advancing direction of the vehicle 1 with respect to the travel lane 2 on a map stored beforehand in the storage unit of the ECU 10 may be identified, based on the absolute location of the vehicle 1 that has been detected by the positioning unit 5 and the absolute azimuth of the vehicle 1 that has been calculated, based on a detection value of the yaw rate sensor 6.

Next, the first derivation unit 12 derives, by use of a curve fitting method such as a least squares method, cubic functions $F_{1L}(X)$ and $F_{1R}(X)$ of following Expressions (i) and (ii), which respectively approximate left and right division lines (or curbstones, guardrails, or the like) 2L and 2R that have been recognized by the lane recognition unit 11.

$$F_{1L}(X)=C_{3L}X^3+C_{2L}X^2+C_{1L}X+C_{0L} \quad \text{(i)}$$

$$F_{1R}(X)=C_{3R}X^3+C_{2R}X^2+C_{1R}X+C_{0R} \quad \text{(ii)}$$

Next, the first derivation unit 12 derives the first function $F_1(X)$ of a following Expression (iii) corresponding to the travel path that passes through the center 2C of the travel lane 2, based on the cubic functions $F_{1L}(X)$ and $F_{1R}(X)$ respectively corresponding to the left and right division lines 2L and 2R.

$$F_1(X)=C_3X^3+C_2X^2+C_1X+C_0 \quad \text{(iii)}$$

$$C_3=(C_{3L}+C_{3R})/2, C_2=(C_{2L}+C_{2R})/2$$

$$C_1=(C_{1L}+C_{1R})/2, C_0=(C_{0L}+C_{0R})/2$$

The road shape of a typical curved road is designed with a clothoid curve in which a curvature changes at a certain rate, and some sections of the clothoid curve corresponding to the road shape can be approximated by use of a higher-order function such as a cubic function. In a case where the road shape is approximated by use of the higher-order function such as the cubic function, the arithmetic load can be reduced, as compared with a case where the road shape is approximated by use of the clothoid curve.

The curvature radius calculation unit 13 calculates a curvature radius R of the travel lane 2 in a traveling location after a predetermined period of time (hereinafter, a prediction time) $t_p$, based on the speed V of the vehicle 1 that has been detected by the vehicle speed sensor 4 and the first function $F_1(X)$ that has been derived by the first derivation unit 12. The prediction time $t_p$ is a traveling period of time, which is a period from the current time to the time when passing through a target passing point P, and which is set beforehand for defining the target passing point P through which the target travel path is to pass. An x-coordinate (prediction distance) $X_p$ of the target passing point P corresponding to the traveling location after the prediction time $t_p$ is calculated by use of a following Expression (iv).

$$X_p = V t_p \qquad (iv)$$

The curvature radius R of the travel lane 2 in the traveling location after the prediction time $t_p$ is calculated as a turning radius of the travel path that passes through the center 2C of the travel lane 2 by use of a following Expression (v). A case where R>0 is satisfied corresponds to a left turn, and a case where R<0 is satisfied corresponds to a right turn.

$$R = \{1 + (3C_3 X_p^2 + 2C_2 X_p + C_1)^2\}^{1.5} / (6C_3 X_p + 2C_2) \qquad (v)$$

Figure 4:
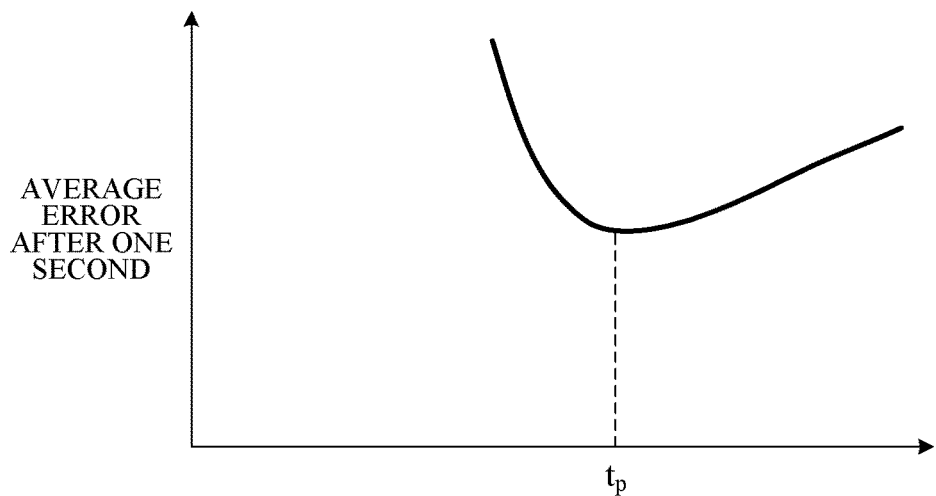
FIG. 4 is a diagram for describing setting of a prediction time for defining a target passing point.

FIG. 4 is a diagram for describing the setting of the prediction time $t_p$, and illustrates an example of an error (average value) in the vehicle width direction between the target travel path and an actual travel path after one second elapses from the current time in a case where the target passing point P is defined by changing the prediction time $t_p$. As illustrated in FIG. 4, even though the prediction time $t_p$ (prediction distance $X_p$) is too short and the target passing point P is too close, and even though the prediction time $t_p$ (prediction distance $X_p$) is too long and the target passing point P is too far, an error between the target travel path and the actual travel path will increase. The prediction time $t_p$ is set to an optimum time (for example, approximately 3.1 seconds), based on a result of a test that has been conducted beforehand, or the like.

The lane width estimation unit 14 estimates a lane width W of the travel lane 2 that has been recognized by the lane recognition unit 11. For example, which one of lane widths W1, W2, and W3 (W1<W2<W3) is set beforehand is identified for every several centimeters.

The offset determination unit 15 determines an offset amount ΔY to be offset inward in the turning direction from the center 2C of the travel lane 2 in the traveling location after the prediction time $t_p$, based on the lane width W that has been estimated by the lane width estimation unit 14 and the curvature radius R that has been calculated by the curvature radius calculation unit 13. More specifically, as illustrated in FIG. 3, the offset determination unit 15 determines the offset amount ΔY between the traveling location $(X_p, Y_p)$ on the travel path (first function $F_1(X)$) that passes through the center 2C of the travel lane 2 after the prediction time $t_p$ elapses, and the target passing point P. A y-coordinate $Y_p$ on the travel path after the prediction time $t_p$ that passes through the center 2C of the travel lane 2 is calculated by use of a following Expression (vi).

$$Y_p = F_1(X_p) = C_3 X_p^3 + C_2 X_p^2 + C_1 X_p + C_0 \qquad (vi)$$

Figure 5:
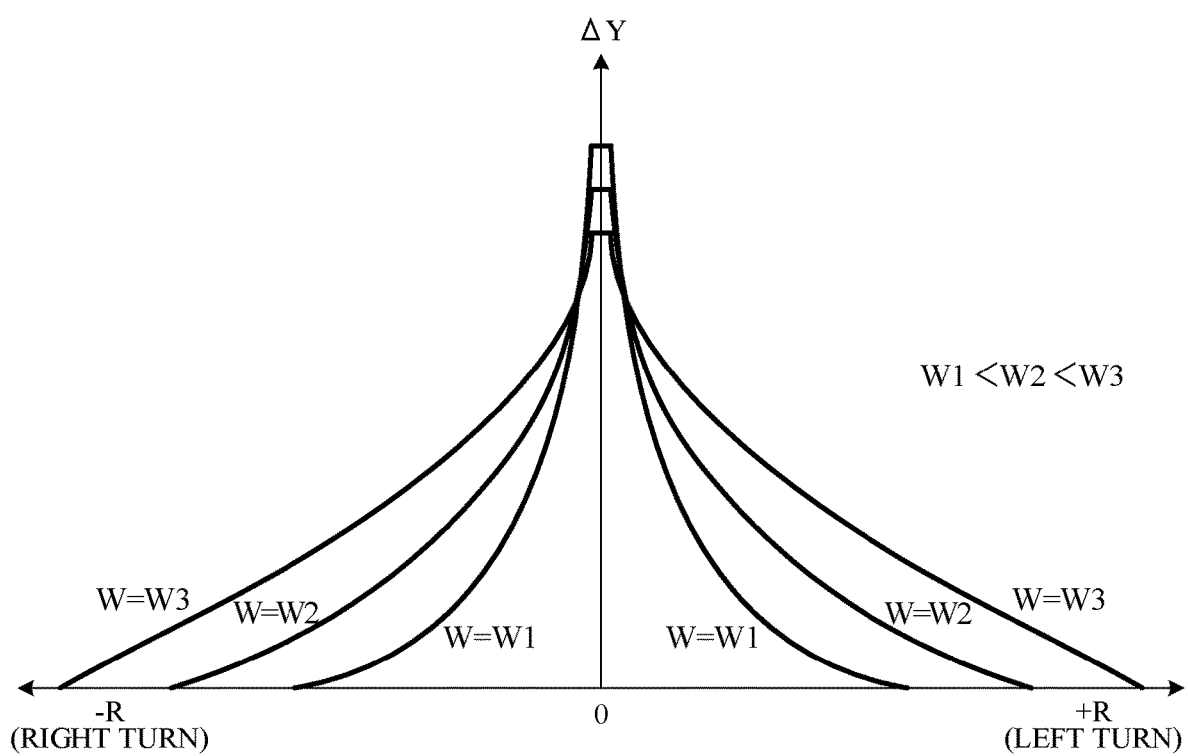
FIG. 5 is a diagram for describing determination of an offset amount by an offset determination unit shown in FIG. 2.

FIG. 5 is a diagram for describing determination of the offset amount ΔY by the offset determination unit 15, and illustrates an example of characteristics stored beforehand in the storage unit of the ECU 10. The offset determination unit 15 refers to the characteristics stored in the storage unit of the ECU 10, and determines the offset amount ΔY, based on the lane width W that has been estimated by the lane width estimation unit 14 and the curvature radius R that has been calculated by the curvature radius calculation unit 13.

As illustrated in FIG. 5, the offset amount ΔY is set to be larger as the lane width W is larger, and is set to be smaller as the absolute value of the curvature radius R is larger. An upper limit value is provided for the offset amount ΔΔY in accordance with the lane width W. For a straight road or an extremely gently curved road similar to the straight road, the offset amount ΔY is set to "0".

The second derivation unit 16 derives a second function $F_2(X)$ representing the target travel path of the vehicle 1 that has been offset, based on the first function $F_1(X)$ that has been derived by the first derivation unit 12 and the offset amount ΔY that has been determined by the offset determination unit 15. In other words, the second derivation unit 16 derives the second function $F_2(X)$ of a following Expression (vii) representing the target travel path that passes through the origin O that is the current location of the vehicle 1 and the target passing point P $(X_p, Y_p + \Delta Y)$.

$$F_2(X) = C_3 X^3 + C_2(\hat{\ }) X^2 \qquad (vii)$$

$$C_2(\hat{\ }) = (Y_p + \Delta Y - C_3 X_p^3)/X_p^2$$

As indicated in Expression (vii), by expressing the target travel path in the second function $F_2(X)$, which is a cubic function, it is possible to generate the target travel path along the road shape that has been designed by use of the clothoid curve. In addition, by applying a coefficient $C_3$ of a third-order term of the first function $F_1(X)$ representing the travel path that passes through the center of the travel lane 2 indicated in Expression (iii) as a coefficient of the third-order term of the second function $F_2(X)$ indicated in Expression (vii), it becomes possible to generate a target travel path that is natural in accordance with the shape of the travel lane 2.

Furthermore, as illustrated in Expression (vii), by setting "0" to the coefficient of the first-order term of the second function $F_2(X)$ representing the target travel path in a coordinate system in which the advancing direction of the vehicle 1 is set to x-axis, the current advancing direction of the vehicle 1 and the advancing direction on the target travel path match each other. Specifically, since an inclination $F_2'(0)$ of a tangential line of the second function $F_2(X)$ representing the advancing direction on the target travel path is "0" at the origin O that is the current location of the vehicle 1, the current advancing direction of the vehicle 1 and the advancing direction on the target travel path match each other. In addition, by setting the constant term of the second function $F_2(X)$ to "0", the current traveling location of the vehicle 1 and the traveling location on the target travel path match each other on the origin O. Accordingly, it becomes possible to smoothly connect the travel path on which the vehicle 1 has actually traveled to the current time with the target travel path from the current time.

Figure 6:
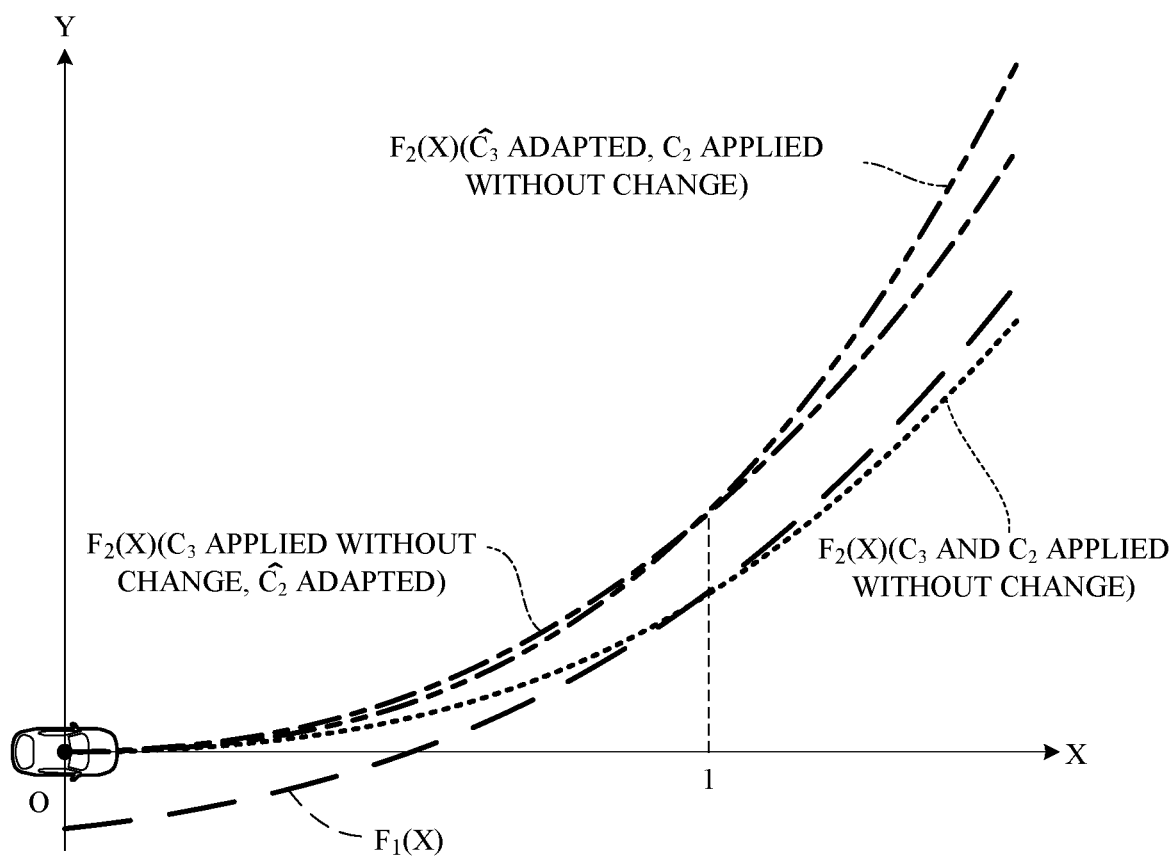
FIG. 6 is a diagram for describing derivation of the second function by the second derivation unit shown in FIG. 2.

FIG. 6 is a diagram for describing derivation of the second function $F_2(X)$ by the second derivation unit 16, and illustrates an example of the second function $F_2(X)$ in changing a method for adapting a coefficient of a higher-order term. As indicated by a dotted line, it is not possible to generate a target travel path to be appropriately offset inward in the turning direction, even though the coefficient $C_3$ of the third-order term and the coefficient $C_2$ of the second-order term of the first function $F_1(X)$ are merely applied respectively as the coefficient $C_3$ of the third-order term and the coefficient $C_2$ of the second-order term of the second function $F_2(X)$ without a change.

On the other hand, by adapting at least one of the coefficients of the higher-order term so that the second function $F_2(X)$ passes through the target passing point P $(X_p, Y_p + \Delta Y)$ in FIG. 3, it is possible to offset the target travel path inward in the turning direction in an appropriate manner. This enables an appropriate offset amount ΔY to be set in accordance with the curvature of the travel lane 2, and enables generation of a target travel path that is natural, like when a skilled driver drives on the curved road.

Furthermore, in a case where a coefficient $C_2(\hat{\,})$ of the second-order term is adapted by applying the coefficient $C_3$ of the third-order term (one-dot chain line), it is possible to generate a target travel path that is offset at an earlier stage than that of a case where the coefficient $C_3(\hat{\,})$ of the third-order term is adapted by applying the coefficient $C_2$ of the second-order term (two-dot chain line). That is, regarding the characteristics of a higher-order function, by setting the coefficient of a lower-order term to be large at an early stage before the x-coordinate corresponding to the traveling location of the vehicle 1 reaches "1", it is possible to increase the y-coordinate corresponding to the offset amount that is offset inward in the turning direction. In this case, it is possible to generate a target travel path to be offset in a gentler manner.

The travel control unit 17 controls the travel actuator 3 so that the vehicle 1 travels along the target travel path, which is represented by the second function $F_2(X)$ that has been derived by the second derivation unit 16, and which is offset inward in the turning direction in an appropriate manner. This enables the vehicle 1 to travel along the target travel path that is natural, like when the skilled driver drives on the curved road.

The present embodiment is capable of achieving the following operations and effects.

(1) The apparatus 100 includes: the lane recognition unit 11, which recognizes the travel lane 2 in which the vehicle 1 is traveling; the first derivation unit 12, which derives a first function $F_1(X)$ representing a travel path that passes through the center of the travel lane 2 that has been recognized by the lane recognition unit 11; the curvature radius calculation unit 13, which calculates a curvature radius R of the travel lane 2 that has been recognized by the lane recognition unit 11; the offset determination unit 15, which determines an offset amount $\Delta Y$ to be offset inward in a turning direction from the center of the travel lane 2, based on the curvature radius R that has been calculated by the curvature radius calculation unit 13; and the second derivation unit 16, which derives a second function $F_2(X)$ representing the target travel path of the vehicle 1 that has been offset, based on the first function $F_1(X)$ that has been derived by the first derivation unit 12 and the offset amount $\Delta Y$ that has been determined by the offset determination unit 15 (FIG. 2).

This enables an appropriate offset amount $\Delta Y$ to be set in accordance with the curvature of the travel lane 2, and enables generation of a target travel path that is natural, like when the skilled driver drives on the curved road (FIGS. 1 and 3).

(2) The first function $F_1(X)$ and the second function $F_2(X)$ are each a higher-order function of a quadratic or higher one in which the advancing direction of the vehicle 1 is set to x-axis and the vehicle width direction is set to y-axis. By approximating a clothoid curve representing a typical road shape by use of a higher-order function such as a cubic function, it is possible to reduce an arithmetic load necessary for generating a target travel path.

(3) The first function $F_1(X)$ and the second function $F_2(X)$ are each a cubic function. The second derivation unit 16 sets the coefficient $C_3$ of the third-order term of the first function $F_1(X)$ that has been derived by the first derivation unit 12 to the coefficient of the third-order term of the second function $F_2(X)$, and sets the coefficient of the first-order term and the constant term of the second function $F_2(X)$ to "0", and determines the coefficient $C_2(\hat{\,})$ of the second-order term of the second function $F_2(X)$, based on the offset amount $\Delta Y$ that has been determined by the offset determination unit 15.

By applying the coefficient $C_3$ of the third-order term of the first function $F_1(X)$ representing the travel path that passes through the center of the travel lane 2, a target travel path that is natural in accordance with the shape of the travel lane 2 can be generated.

In addition, by setting the coefficient of the first-order term of the second function $F_2(X)$ representing the target travel path to "0" in a coordinate system in which the advancing direction of the vehicle 1 is set to x-axis, the current advancing direction of the vehicle 1 and the advancing direction on the target travel path can be made to match each other. In addition, by setting the constant term of the second function $F_2(X)$ to "0", the current traveling location of the vehicle 1 and the traveling location on the target travel path can be made to match each other. Accordingly, it becomes possible to smoothly connect the travel path on which the vehicle 1 has actually traveled to the current time with the target travel path from the current time.

Furthermore, by adapting the coefficient $C_2(\hat{\,})$ of the second-order term from the coefficients $C_3$ and $C_2(\hat{\,})$ of the higher-order terms, it is possible to generate a target travel path that is offset inward in the turning direction earlier and gently (FIG. 6).

(4) The first derivation unit 12 and the second derivation unit 16 identify the advancing direction of the vehicle 1 with respect to the travel lane 2, based on a recognition result by the lane recognition unit 11, and respectively derive the first function $F_1(X)$ and the second function $F_2(X)$ with the identified advancing direction of the vehicle 1 as x-axis. The travel lane 2 is recognized based on the detection result by the external sensor 7 such as a camera provided for capturing an image of a forward side of the vehicle with the advancing direction of the vehicle 1 as the center. Thus, the advancing direction of the vehicle 1 with respect to the travel lane 2 is identifiable, based on a recognition result (FIG. 3).

(5) The apparatus 100 further includes the yaw rate sensor 6, which is mounted on the vehicle 1, and which detects a rotation angular velocity around a vertical axis of the center of gravity of the vehicle 1 (FIG. 2). The first derivation unit 12 and the second derivation unit 16 identify the advancing direction of the vehicle 1 with respect to the travel lane 2, based on a signal from the yaw rate sensor 6, and respectively derive the first function $F_1(X)$ and the second function $F_2(X)$ with the identified advancing direction of the vehicle 1 as x-axis. For example, the advancing direction of the vehicle 1 with respect to the travel lane 2 on a map is identifiable, based on an absolute location of the vehicle 1 that has been detected by the positioning unit 5 and an absolute azimuth of the vehicle 1 to be calculated, based on a detection value of the yaw rate sensor 6 (FIG. 3).

(6) The apparatus 100 further includes the travel control unit 17, which controls the travel actuator 3 to conduct driving assistance for the driver of the vehicle 1 or to automatically drive the vehicle 1 (FIG. 2). The travel control unit 17 controls the travel actuator 3, based on the second function $F_2(X)$ that has been derived by the second derivation unit 16. This enables the vehicle 1 to travel along the target travel path that is natural, like when the skilled driver drives on the curved road (FIG. 1 and FIG. 3).

In the above embodiments, an example in which the lane recognition unit 11 recognizes the travel lane 2, based on a signal from the external sensor 7 has been described. However, the lane recognition unit that recognizes the travel lane is not limited to such an example, and may identify the travel lane 2 on a map based on, for example, map information.

In the above embodiments, the first function $F_1(X)$ and the second function $F_2(X)$ have been described as higher-order functions such as cubic functions. However, the first function and the second function are not limited to such functions. It is sufficient if the second function passes through at least the origin O that is the current location of the vehicle 1 and the target passing point P $(X_p, Y_p+\Delta Y)$. The second function may be, for example, a function such as a linear function, a circle, or a sine curve.

In the above embodiments, an example in which the apparatus 100 includes the travel control unit 17 has been described. However, the path generation apparatus is not limited to such an example. For example, a display control unit, which controls a display unit such as a head-up display for displaying a target travel path represented by the second function $F_2(X)$ that has been derived by the second derivation unit 16 to be superimposed on a road on a forward side of the vehicle, may be included.

The above embodiment can be combined as desired with one or more of the aforesaid modifications. The modifications can also be combined with one another.

According to the present invention, it becomes possible to generate a target travel path that is natural, like when the skilled driver drives on the curved road.

Above, while the present invention has been described with reference to the preferred embodiments thereof, it will be understood, by those skilled in the art, that various changes and modifications may be made thereto without departing from the scope of the appended claims.

The invention claimed is:

1. A path generation apparatus configured to generate a target travel path of a vehicle, comprising:
    an external sensor mounted on the vehicle and configured to detect an external situation centered on an advancing direction of the vehicle; and
    an electronic control unit including a processor and a memory coupled to the processor, wherein
    the electronic control unit is configured to perform:
        recognizing a travel lane where the vehicle travels based on the external situation detected by the external sensor;
        deriving a first function representing a travel path along a center of the travel lane;
        calculating a curvature radius of the travel lane;
        determining an offset amount to be offset inward in a turning direction from the center of the travel lane based on the curvature radius;
        deriving a second function representing the target travel path of the vehicle that has been offset based on the first function and the offset amount; and
        controlling a travel actuator to conduct driving assistance for a driver of the vehicle or to automatically drive the vehicle based on the second function, wherein
    the first function and the second function are respectively a cubic function in which the advancing direction is set to an x-axis and a vehicle width direction of the vehicle is set to a y-axis, wherein
    the deriving the second function includes:
        setting a coefficient of a third-order term of the first function to a coefficient of a third-order term of the second function;
        setting a coefficient of a first-order term and a constant term of the second function to zero; and
        deriving a coefficient of a second-order term of the second function based on the offset amount.

2. The path generation apparatus according to claim 1, wherein
    the deriving the first function and the second function includes:
        identifying the advancing direction of the vehicle with respect to the travel lane based on a recognition result of the travel lane; and
        deriving the first function and the second function by setting the advancing direction of the vehicle to the x-axis.

3. The path generation apparatus according to claim 1, further comprising:
    a yaw rate sensor mounted on the vehicle and configured to detect a rotation angular velocity around a vertical axis of a center of gravity of the vehicle, wherein
    the deriving the first function and the second function includes:
        identifying the advancing direction of the vehicle with respect to the travel lane based on a detection result by the yaw rate sensor; and
        deriving the first function and the second function by setting the advancing direction of the vehicle to the x-axis.

4. The path generation apparatus according to claim 1, wherein
    the external sensor includes at least one of a camera, a millimeter wave radar, and a LiDAR.

5. The path generation apparatus according to claim 1, wherein
    the offset amount is set to be smaller as an absolute value of the curvature radius of the travel lane is larger.

6. A path generation method configured to generate a target travel path of a vehicle, comprising:
    recognizing a travel lane where the vehicle travels based on an external situation centered on an advancing direction of the vehicle detected by an external sensor mounted on the vehicle;
    deriving a first function representing a travel path along a center of the travel lane;
    calculating a curvature radius of the travel lane;
    determining an offset amount to be offset inward in a turning direction from the center of the travel lane based on the curvature radius;
    deriving a second function representing the target travel path of the vehicle that has been offset based on the first function and the offset amount; and
    controlling a travel actuator to conduct driving assistance for a driver of the vehicle or to automatically drive the vehicle based on the second function, wherein
    the first function and the second function are respectively a cubic function in which the advancing direction is set to an x-axis and a vehicle width direction of the vehicle is set to a y-axis, wherein
    the deriving the second function includes:
        setting a coefficient of a third-order term of the first function to a coefficient of a third-order term of the second function;
        setting a coefficient of a first-order term and a constant term of the second function to zero; and
        deriving a coefficient of a second-order term of the second function based on the offset amount.

7. The path generation method according to claim 6, wherein the deriving the first function and the second function includes:
identifying the advancing direction of the vehicle with respect to the travel lane based on a recognition result of the travel lane; and
deriving the first function and the second function by setting the advancing direction of the vehicle to the x-axis.

8. The path generation method according to claim 6, wherein the deriving the first function and the second function includes:
identifying the advancing direction of the vehicle with respect to the travel lane based on a rotation angular velocity around a vertical axis of a center of gravity of the vehicle detect by a yaw rate sensor mounted on the vehicle; and
deriving the first function and the second function by setting the advancing direction of the vehicle to the x-axis.

9. The path generation method according to claim 6, wherein the external sensor includes at least one of a camera, a millimeter wave radar, and a LiDAR.

10. The path generation method according to claim 6, wherein the offset amount is set to be smaller as an absolute value of the curvature radius of the travel lane is larger.

* * * * *